United States Patent [19]

Testin et al.

[11] Patent Number: 4,656,399
[45] Date of Patent: Apr. 7, 1987

[54] TELEVISION POWER SUPPLY TURN-ON PROTECTION CIRCUIT

[75] Inventors: William J. Testin, Indianapolis, Ind.; Michael P. French, Huntsville, Ala.

[73] Assignee: RCA Corporation, Princeton, N.J.

[21] Appl. No.: 728,661

[22] Filed: Apr. 29, 1985

[51] Int. Cl.$^4$ .............................................. H01J 29/70
[52] U.S. Cl. ..................................... 315/411; 358/190
[58] Field of Search ................ 315/411, 408; 358/190, 358/243

[56] References Cited

U.S. PATENT DOCUMENTS

| | | |
|---|---|---|
| 3,725,739 | 4/1973 | Griffey . |
| 3,970,915 | 7/1976 | Suchko . |
| 4,042,858 | 8/1977 | Collette et al. . |
| 4,045,742 | 8/1977 | Meehan et al. . |
| 4,115,814 | 9/1978 | Kosaka et al. . |
| 4,435,731 | 3/1984 | Kliebphipat et al. . |
| 4,489,394 | 12/1984 | Borg . |
| 4,516,168 | 5/1985 | Hicks ................................... 358/190 |

OTHER PUBLICATIONS

U.S. Patent Application Ser. No. 728,657, entitled Television Power Supply Shutdown Circuit in the names of W. J. Testin et al., filed concurrently with the above--captioned patent application.
U.S. Patent Application Ser. No. 445,776, entitled Shutdown Circuit For A Switching Regulator In A Remote Controlled Television Receiver, in the name of J. E. Hicks filed Nov. 30, 1982.
Technical Information Report No. 006, "Switching Regulator Control IC (AN5900)", Semiconductor Division Matsushita Electronics Corporation, published prior to the filing date of this U.S. patent application.
Color Television Basic Service Data Manual for CTC 111 Chassis Series, Cover Sheet and Schematic, pp. 36, 37 of MSC 025 F. S. Tuner Control Module.

*Primary Examiner*—Theodore M. Blum
*Attorney, Agent, or Firm*—Eugene M. Whitacre; Joseph J. Laks; Sammy S. Henig

[57] ABSTRACT

A power supply for a television deflection apparatus is turned-on by a user initiated turn-on command. A fault detection circuit samples a voltage derived from the deflection circuit at the end of a predetermined interval that follows the turn-on command. The fault detection circuit issues a turn-off command to immediately shutdown the power supply, if such voltage is below a predetermined level indicative of a fault condition.

5 Claims, 3 Drawing Figures

TELEVISION POWER SUPPLY TURN-ON PROTECTION CIRCUIT

The invention relates to a power supply protection arrangement in a television receiver.

In a television receiver that includes a feature such as a remote control input for controlling the operation of the receiver, the control circuit may include a microcomputer that is typically employed for decoding and executing user's commands. Typically, the microcomputer is powered by a stand-by voltage that enables the microcomputer to respond to user's commands even when the deflection circuit power supply is not turned-on. One such user initiated command may be the power turn-on command by which the user requests to energize the television receiver. Such power turn-on command requires that the power supply be turned-on.

When the power supply is initially turned-on, in response, for example, to user initiated power turn-on command, it takes a certain turn-on interval, from the time the turn-on command is issued to the time the power supply voltages are at the normal operating level.

In order to protect the components of a television deflection circuit and its power supply when a fault condition is detected after such turn-on time of the power supply, it may be desirable to turn-off the power supply immediately after the turn-on interval has elapsed. It may also be desirable to cause such power supply shutdown after a turn-on command is issued even when other control circuit components, such as the microcomputer, are faulty.

In accordance with an aspect of the invention, a television deflection power supply includes a fault condition protection circuit. The power supply selectively operates in a power-up mode and in a shut-down mode. In the power-up mode, the power supply generates, under normal operating conditions, a first supply voltage that is within a normal voltage operating range. When the first supply voltage is within the normal voltage operating range, it is indicative of the existence of normal operating conditions. In the shut-down mode, the level of the first supply voltage is outside the normal operating range. The power supply operates in the power-up mode when a first control signal is asserted, and assumes the shut-down mode when a second control signal is asserted. A voltage detector output signal is indicative of the level of the first supply voltage. If at the end time of a turn-on interval, used for turning-on the power supply, that follows the assertion time of the first control signal, the first supply voltage is outside the normal operating range, thus indicating the existence of a fault condition, in accordance with the voltage detector output signal, the second control signal is asserted so that the power supply immediately assumes the shut-down mode. When no fault condition is present, the length of the turn-on interval is sufficiently long for enabling the first supply voltage to attain the level that is within the normal operating range.

In accordance with another aspect of the invention, the first supply voltage is produced by the deflection circuit. Thus, the fault condition protection circuit detects a fault condition in either the power supply or the deflection circuit. If the first supply voltage is not within the normal operating range after the turn-on interval has elapsed, it may be desirable to shut down the power supply immediately. This is done for protecting both deflection and power supply circuit components.

Figure 1:
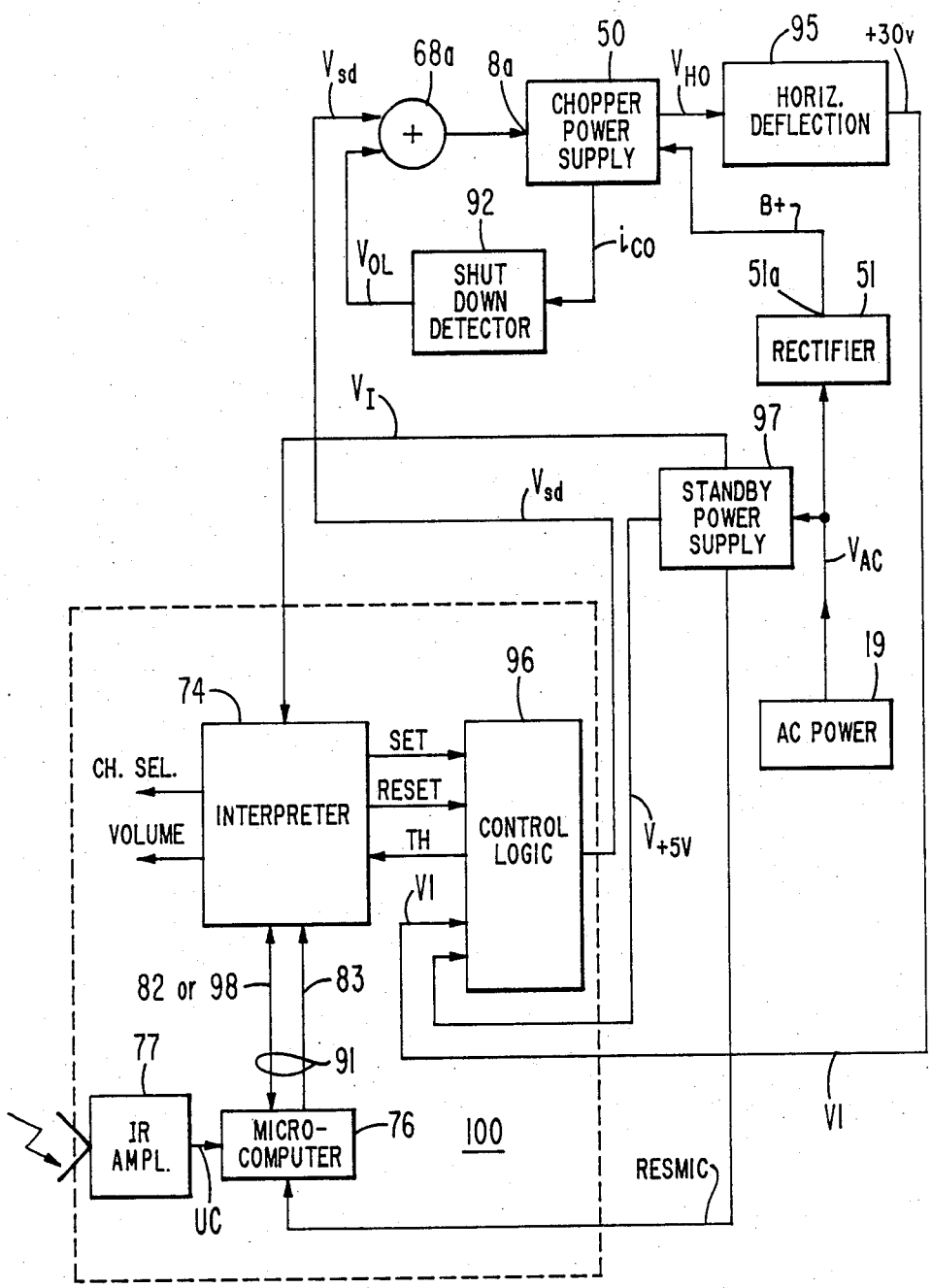
FIG. 1 illustrates a general block diagram of a power supply including a protection circuit, embodying an aspect of the invention, that provides power to a deflection circuit.

A voltage source 19 in FIG. 1 developing an AC voltage $V_{AC}$, is coupled to a bridge rectifier and filter 51 that develops an unregulated raw voltage B+ voltage at an output terminal 51a. Voltage B+ is coupled to a chopper power supply 50 that produces, in a power-up mode, a voltage $V_{HO}$ that energizes a horizontal deflection circuit 95. Circuit 95 produces a DC energizing voltage V1 that is at a normal operating level when both voltage $V_{HO}$ is at its normal operating level and deflection circuit 95 operates properly. A shut-down detector 92 generates a signal $V_{OL}$ when it detects a surge of a current $i_{co}$ in power supply 50 that characterizes an overload condition. Signal $V_{OL}$ causes power supply 50 to operate in a shutdown mode. In the shut-down mode, current $i_{co}$ stops flowing; consequently, voltage $V_{HO}$ drops to a lower level than its normal operating level. However, shut-down detector 92 cannot, by itself, keep power supply 50 in the shut-down mode for a longer period than, illustratively, 250 milliseconds. After such 250 millisecond period has elapsed, shut-down detector 92 is not able to inhibit power supply 50 from returning to the power-up mode. It may be undesirable to permit the recurrence of the power-up mode that follows the shut-down mode initiated by detector 92. This is so because, should the fault condition, that causes detector 92 to initiate the shut-down mode, persist, such a return to the power-up mode may damage television receiver circuit components.

Therefore, a shut-down signal $V_{sd}$ that is coupled to power supply 50 from a control circuit 100, via a signal summing junction 68a, prevents the recurrence of the power-up mode that would otherwise follow, as described later on. Control unit 100 includes a microcomputer 76. Microcomputer 76 receives a user command signal UC, provided from, illustratively, an infra-red amplifier 77 that translates modulated infra-red radiation pulses to serial data stream. Typically, an infra-red transmitter, not shown in the figures, is used for transmitting remote control user initiated commands such as power-on, power-off, volume control and channel select. Microcomputer 76 translates the user commands obtained from signal UC to provide, to an interpreter 74, a data word 82 and a synchronizing clock 83 through a bidirectional, serial buss 91. The functions provided by interpreter 74 may be performed by conventionally designed logic circuitry or by multipurpose hardware such as another microcomputer.

Interpreter 74 generates a signal SET and a signal RESET that are coupled to a control logic 96, in response to power-on and power-off user initiated commands, respectively. Interpreter 74 also generates signals CH.SEL. and signals VOLUME that select, for example, in a conventional manner, the desired channel to be viewed and audio volume level, respectively. Control logic 96 also receives voltage V1 from deflection circuit 95 and a voltage $V_{+5\ V}$ from a stand-by power supply arrangement 97 that is energized by AC voltage $V_{AC}$ even during the power-down mode interval of main power supply 50. Voltage $V_{+5V}$ provides, for example, power to all the circuitry within control circuit 100 even when power supply 50 is in the shutdown mode. Power supply 97 also generates a signal RESMIC that is indicative of a dropout of AC voltage $V_{AC}$ for initializing, or resetting, microcomputer 76 throughout the time in which AC voltage $V_{AC}$ suffers a dropout. Control logic 96 supplies a signal TH to interpreter 74 that can be read in by microcomputer 76. Signal TH is asserted, that is to say, Signal TH=TRUE or HIGH, fo example, if either voltage V1 or $V_{+5V}$ is below the normal operating level.

Figure 3:
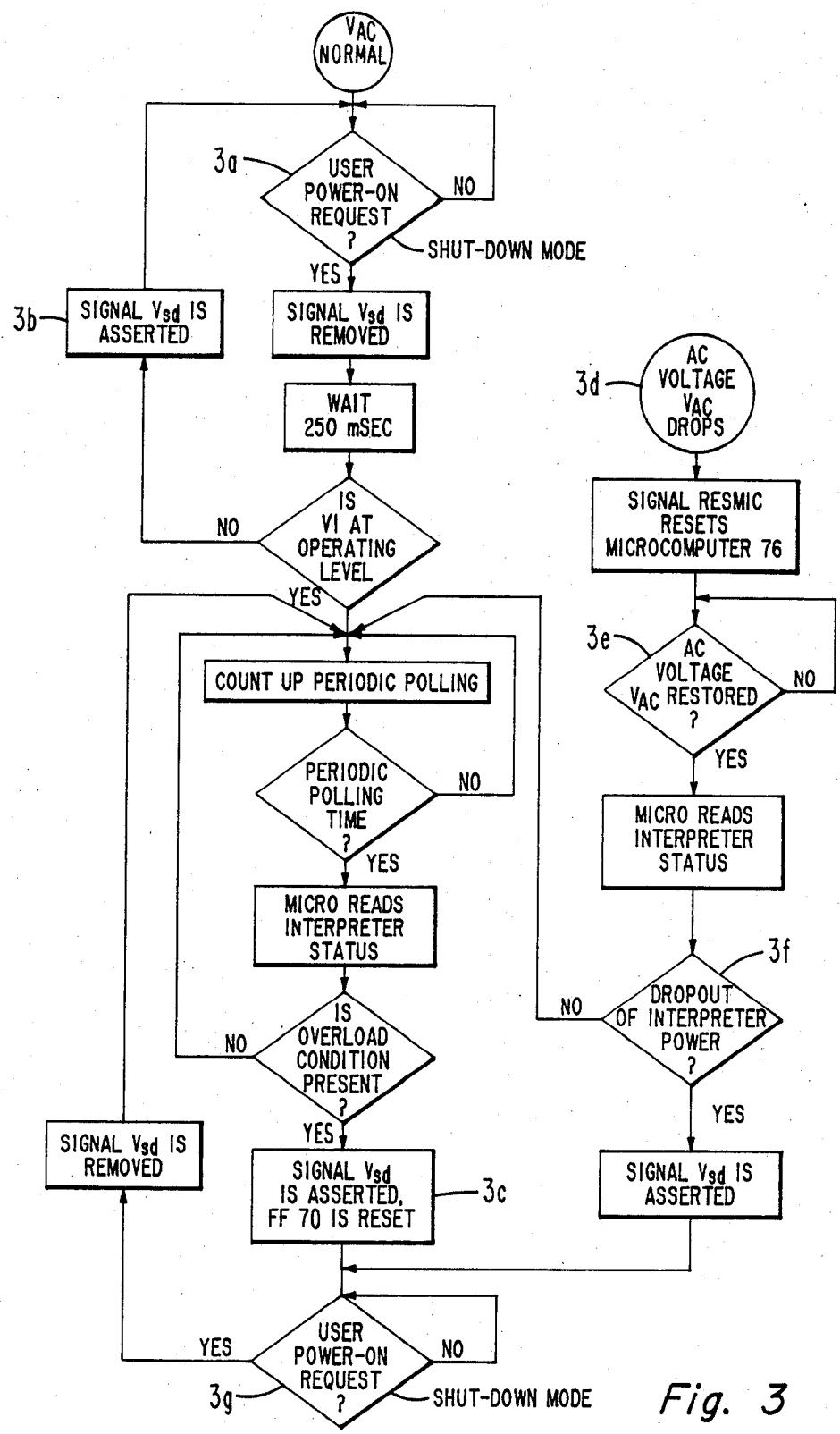
FIG. 3 illustrates a flow chart useful in explaining the operation of the circuit of FIGS. 1 or 2.

The operation of the circuit of FIG. 1 is explained using the flow chart illustrated in FIG. 3, as described in detail in U.S. patent application Ser. No. 728,657 entitled, TELEVISION POWER SUPPLY SHUT-DOWN CIRCUIT in the name of W. Testin and M. P. French, filed concurrently herewith and incorporated by reference herein. Similar numbers and symbols, in FIGS. 1 and 3 indicate similar items or functions.

Prior to the user initiated power-on command, shutdown signa $V_{sd}$ is asserted for maintaining power supply 50 in the shut-down mode. When power-on command is issued, as shown in step 3a of FIG. 3, signal $V_{sd}$ of FIG. 1 is removed, chopper power supply 50 begins operation, and a wait period of, illustratively, 250 milliseconds begins.

In accordance with an aspect of the invention, if at the end of the wait period, voltage V1 is not at the normal operating level, as a result of, for example, a fault condition in deflection circuit 95, signal $V_{sd}$ is asserted and power supply 50 is forced into its shut-down mode, as shown in step 3b of FIG. 3; on the other hand, if voltage V1 of FIG. 1 is at the normal operating level, power supply 50 stays at the power-up mode.

During operation in the power-up mode, control circuit 100 initiates a periodic polling or sampling step at the end of each polling period of, illustratively, 300 milliseconds. In the periodic polling step, microcomputer 76 of control circuit 100 reads in, via buss 91, a data word 98 that contains the status of signal TH and other status information of interpreter 74, such as the volume control status. If a fault condition is not manifested so that signal TH is not asserted, microcomputer 76 begins timing-out the next following polling period.

However, if a fault condition is present, signal TH will have been asserted, and microcomputer 76 causes signal $V_{sd}$ to be asserted by sending corresponding data word 82 instruction to interpreter 74, as shown in step 3c of the flow chart of FIG. 3. As a result of signal $V_{sd}$ of FIG. 1, power supply 50 stays in the shut-down mode until a new user initiated power-on command is issued.

Assume, hypothetically, that during the operation in the power-up mode the amplitude of AC voltage $V_{AC}$ drops, as shown in step 3d of FIG. 3. Consequently, signal RESMIC of FIG. 1 is developed which then causes microcomputer 76 to be in an initialization state as shown in step 3e of FIG. 3.

So long as AC voltage $V_{AC}$ is not restored, microcomputer 76 of FIG. 1 is held in the initialization, or reset state, as indicated in step 3e of FIG. 3. When AC voltage $V_{AC}$ of FIG. 1 is restored, microcomputer 76 reads-in word 98 that contains the status of interpreter 74. A power supply status bit in word 98 informs microcomputer 76 whether a powering voltage $V_I$ of interpreter 74 that is produced in power supply 97 has dropped, as shown in step 3f of FIG. 3. If powering voltage $V_I$ of interpreter 74 of FIG. 1 has not dropped, microcomputer 76 begins timing out the next periodic polling period and the power-up mode of power supply 50 is resumed. Interpreter 74 powering voltage $V_I$ is designed so that a short AC voltage $V_{AC}$ brownout period of, illustratively, two seconds, is not sufficient to cause a dropout of interpreter 74 powering voltage $V_I$. Thus after the end of such short AC voltage $V_{AC}$ brownout period, normal operation can be automatically resumed.

Conversely, if interpreter 74 powering voltage $V_I$ has previously dropped during the AC voltage $V_{AC}$ brownout period, signal RESET is asserted by interpreter 74. Signal RESET causes that voltage $V_{sd}$ is asserted, thus forcing power supply 50 to enter into the shut-down mode, and that power supply 50 stays in the shut-down mode even after AC voltage $V_{AC}$ is restored, as shown in step 3g of FIG. 3. Thus a user initiated power on command is required for resuming normal operation.

Figure 2:
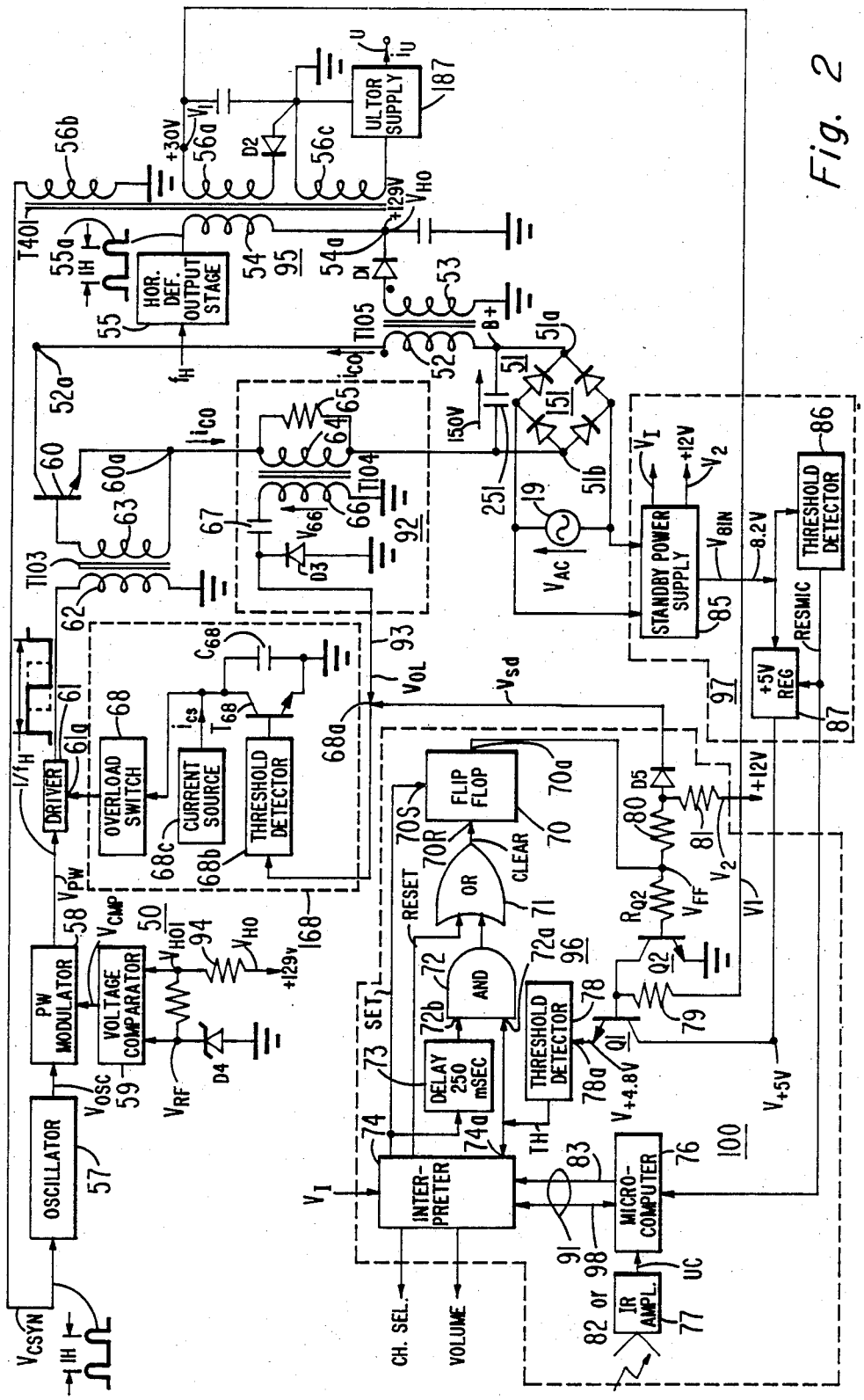
FIG. 2 illustrates a more detailed block diagram of the circuit of FIG. 1.

FIG. 2 illustrates a more detailed block diagram of the arrangement of FIG. 1. Similar numbers and symbols in FIGS. 1, 2 and 3 indicate similar items or functions. Referring to FIG. 2, terminal 51a of bridge rectifier 51 is coupled to one end terminal of a primary winding 52 of a chopper transformer T105. A second end terminal 52a of winding 52 is coupled to the output of a chopper output switch 60. A secondary winding 53 of transformer T105 develops a voltage that is rectified by a diode D1 to produce voltage $T_{HO}$ of, illustratively, 129 volts that energizes a primary winding 54 at a terminal 54a of a flyback transformer T401. Winding 54 is coupled to a conventionally built horizontal deflection output stage 55. Horizontal deflection output stage 55 is synchronized by horizontal sync pulses that are separated, by a conventional sync separator, from an output of a video detector that are not shown in figures.

A retrace pulse voltage 55a at primary winding 54 produces a like voltage across a secondary winding 56a that is rectified by a diode D2 to produce DC voltage V1 of, illustratively, 30 volts.

An ultor voltage power supply 187 is coupled to a secondary winding 56c for generating an ultor voltage U for a cathode ray tube (CRT) that is not shown in the figures. A secondary winding 56b of transformer T401 supplies a horizontal rate $f_H$ synchronizing voltage $V_{CSYN}$ that synchronizes a signal $V_{OSC}$ of an oscillator 57 of chopper power supply 50 to have the same operating frequency $f_H$. Horizontal rate voltage $V_{OSC}$, generated by oscillator 57, is coupled to a pulse width modulator 58 that generates a horizontal rate variable duty cycle voltage $V_{PW}$.

Voltage $V_{PW}$ is coupled to a driver 61 that drives a primary winding 62 of a transformer T103. The voltage developed at a secondary winding 63 of transformer T103 controls the turn-on time of output switch 60, and hence, the duty cycle of current $i_{co}$ that flows out of a terminal 60a of output switch 60. When switch 60 is conductive, in accordance with the active portion of voltage $V_{PW}$ duty cycle, terminal 52a of winding 52 of transformer T105 is coupled to terminal 60a to conduct current $i_{co}$ from terminal 60a. Current $i_{co}$ is thus conducted from terminal 60a, through an arrangement that includes a resistor 65 in parallel with a primary winding 64 of an overcurrent shut-down transformer T104 of shut-down detector 92, and to current return terminal 51b of bridge rectifier 151. When switch 60 is nonconductive, in accordance with the inactive portion of voltage $V_{PW}$ duty cycle, terminals 52a and 60a are not coupled so that current $i_{co}$ does not flow in primary winding 52.

Voltage $V_{PW}$ has a duty cycle that is determined in accordance with a voltage $V_{CMP}$ of a voltage comparator 59 that is also coupled to pulse width modulator 58. Voltage $V_{HO}$ from terminal 54a of winding 54, is coupled through a resistor 94 to produce a reference voltage $V_{RF}$ across a zener diode D4 and a voltage $V_{HO1}$ that follows the variations of voltage $V_{HO}$. Voltages $V_{HO1}$ and $V_{RF}$ are coupled to respective input terminals of comparator 59. Voltage $V_{CMP}$ is indicative of the difference between voltage $V_{HO1}$ and reference voltage $V_{RF}$. When voltage $V_{HO1}$ is larger than voltage $V_{RF}$, voltage $V_{CMP}$ causes that the duty cycle of voltage $V_{PW}$ and of current $i_{co}$ in winding 52 of transformer T105 to be, illustratively, shorter. Conversely, when voltage $V_{HO1}$ is smaller than voltage $V_{RF}$, voltage $V_{CMP}$ causes the duty cycle of voltage $V_{PW}$ and of current $i_{co}$ in winding 52 to be longer. Thus, comparator 59 voltage $V_{CMP}$ regulates the level of voltage $V_{HO}$ by controlling the duty cycle of current $i_{co}$ through winding 52 of transformer T105.

A voltage $V_{66}$, developed across a secondary winding 66 of shut-down transformer T104 is coupled through a capacitor 67 to produce, on a line 93, voltage $V_{OL}$ that appears at a control terminal 68a of a shut-down detector 92. Diode D3 allows substantially only positive pulses of voltage $V_{66}$, developed across winding 66, to appear at terminal 68a. A threshold detector 68b of a shutdown circuit 168, in power supply 50, is coupled to receive the voltage at terminal 68a. Threshold detector 68b causes a transistor $T_{68}$ to be conductive when the voltage at terminal 68a exceeds a threshold voltage. A capacitor $C_{68}$ is coupled between the emitter and collector electrodes of transistor $T_{68}$. When transistor $T_{68}$ is conductive, capacitor $C_{68}$ is immediately discharged. A current source 68c is coupled to the collector electrode of transistor $T_{68}$ for charging capacitor $C_{68}$ when transistor $T_{68}$ is nonconductive. The voltage across capacitor $C_{68}$ is coupled between respective input terminals of an overload switch 68 having an output terminal that is coupled to a terminal 61a of driver 61.

So long as the voltage across capacitor $C_{68}$ is below a first predetermined level, overload switch 68 is conductive. When switch 68 is conductive, it prevents driver 61 from energizing transformer T103, thus causing power supply 50 to be at its shut-down mode.

The power-up mode is initiated after the voltage at terminal 68a goes below the threshold voltage of detector 68b. This causes transistor $T_{68}$ to be nonconductive. The result is that current source 68c generates a ramping-up voltage across capacitor $C_{68}$. It takes, illustratively, 250 milliseconds period to charge capacitor $C_{68}$ to a voltage that exceeds the first predetermined level. At the end of the 250 millisecond period, switch 68, that becomes nonconductive, activates driver 61. Thus operation in the power-up mode of power supply 50 is resumed.

The functions performed by shut-down circuit 168, PW modulator 58 and voltage comparator 59 of power supply 50 of FIG. 2 may be similar to that of the switching regulator control IC AN5900 manufactured by the Semiconductor Divison of Matsushita Electronics Corporation, Tokyo, Japan. Control IC AN5900 is described in U.S. patent application Ser. No. 445,776 entitled, SHUTDOWN CIRCUIT FOR A SWITCHING REGULATOR IN A REMOTE CONTROLLED TELEVISION RECEIVER, in the name of J. E. Hicks, filed Nov. 30, 1982 and incorporated by reference herein. In IC AN5900, for example, shut-down is effected in a slightly different manner than that illustrated in FIG. 2. Shutdown is effected by controlling the voltage at an input terminal of a voltage comparator that is analogous to voltage comparator 59 of FIG. 2.

A voltage $V_{FF}$ at an inverted output terminal 70a of a flip-flop 70 of control unit 100 is coupled through a resistor 80 in series with a diode D5 to produce a shut-down voltage $V_{sd}$ at terminal 68a. Voltage $V_{FF}$ is by a voltage V2, of standby power supply 97, that is coupled through a pull-up resistor 81 and resistor 80 to terminal 70a. When flip-flop 70 is reset to a high output state at terminal 70a, voltage $V_{sd}$ at terminal 68a exceeds the threshold voltage of detector 68b, thus causing overload switch 68 to be conductive. As explained before, when switch 68 is conductive, chopper power supply 50 is in the shut-down mode. When flip-flop 70 is set to a low output state, at ground potential, for example, voltage $V_{sd}$ does not exceed the threshold voltage of detector 68b thus permitting power supply 50 to operate in its power-up mode; this is so provided that voltage $V_{OL}$ of detector 92 does not activate overload switch 68. In the power-up mode, voltage $V_{HO}$, for example, is at the appropriate level for enabling horizontal deflection circuit 55 to generate the required retrace pulse voltage 55a that energizes flyback transformer T401.

Voltage $V_{FF}$ is also coupled to the base electrode of a common emitter transistor switch Q2 through a resistor $R_{Q2}$. The collector electrode of transistor switch Q2 is coupled to the base electrode of a transistor switch Q1 and to a pull-up resistor 79. The end terminal of resistor 79 that is not coupled to the collector electrode is coupled to voltage V1, obtained from flyback transformer T401. The collector electrode of transistor switch Q1 is coupled to voltage $V_{+5V}$ that is, typically, +5 volts; the emitter electrode is coupled to an input terminal 78a of a threshold detector 78 to provide a voltage $V_{+4.8 v}$. Threshold detector 78 causes that signal TH is asserted when voltage $V_{+4.8 v}$ is lower than a predetermined threshold voltage. Signal TH is coupled to an input terminal 74a of interpreter 74 to provide information of voltage fault condition and to an input terminal 72a of an AND gate 72 for resetting flip-flop 70, as described below.

Interpreter 74 generates a pulse signal SET in response to a user's power-on command that sets flip-flop 70, causing voltage $V_{FF}$ to be low, thus enabling the power-up mode in chopper power supply 50. Interpreter 74 pulse signal SET is also coupled through a delay unit 73 to an input terminal 72b of AND gate 72.

In accordance with an aspect of the invention, when pulse signal SET occurs, flip-flop 70 is set. After a delay time of 250 millisecond in delay unit 73, pulse signal SET that propogates through delay unit 73 will appear at terminal 72b of AND gate 72. If signal TH is, simultaneously, asserted at input terminal 72a of AND gate 72, the signal at its output terminal 72c is asserted, consequently, a signal CLEAR is generated by OR gate 71 that resets flip-flop 70. When flip-flop 70 is reset, voltage $V_{FF}$ generates signal $V_{sd}$. As explained before, signal $V_{sd}$ forces the shut-down mode in power supply 50.

Interpreter 74 signal RESET is coupled to an input terminal of an OR gate 71. Signal RESET may occur as a result of user initiated power-off command and when voltage $V_{AC}$ is first applied to the set. A second input terminal of OR gate 71 is coupled to the output terminal of AND gate 72. The output terminal of OR gate 71 is coupled to an input terminal 70R of flip-flop 70 to provide signal CLEAR that resets flip-flop 70 when either signal RESET or when both the signals at terminals 72a and 72b are asserted. When flip-flop 70 is reset, signal $V_{FF}$ is caused to be sufficiently high, by voltage V2 of stand-by power supply 97, for forcing power supply 50 into the shut-down mode.

AC voltage $V_{AC}$ also energizes a DC power supply 85 of standby power supply 97 that generates a voltage $V_{8\ IN}$ that is, illustratively, 8.2 volts. Voltage $V_{8\ IN}$ is coupled to a threshold detector 86 that asserts microcomputer 76 reset signal RESMIC when voltage $V_{8\ IN}$ falls below a predetermined threshold level. Signal RESMIC is also coupled to a control terminal of a regulator 87 that is coupled, in series with voltage $V_{8\ IN}$. Regular 87 supplies $V_{+5}$ of, illustratively, +5 volts when voltage $V_{8\ IN}$ is above threshold detector 86 threshold level. In contrast, when signal RESMIC is asserted voltage $V_{+5\ V}$ drops to zero volts. Voltage $V_{+5\ V}$ is coupled to the collector electrode of transistor switch Q1.

In response to a user initiated power-on command, microcomputer 76 sends an instruction via buss 91 to interpreter 74 that causes interpreter 74 to generate pulse signal SET. Consequently, flip-flop 70 is set and flip-flop 70 output voltage $V_{FF}$ is low, resulting in the initiation of the power-up mode in chopper power supply 50.

When voltage $V_{FF}$ is low, as a result of flip-flop 70 being set, transistor switch Q2 is nonconductive and base electrode of transistor switch Q1 current that is supplied from voltage V1 through resistor 79 causes transistor switch Q1 to be conductive, thereby coupling voltage $V_{+5V}$ to terminal 78a of threshold detector 78 to provide voltage $V_{+4.8\ V}$. If voltage $V_{+4.8\ V}$ is below the threshold level of detector 78, signal TH is asserted; otherwise, signal TH is not asserted.

Signal TH is asserted if, for example, voltage V1 is not generated as a result of a fault condition in power supply 50 or in deflection circuit 95. If voltage V1 is not generated, transistor switch Q1 is nonconductive, so that voltage $V_{+4.8\ V}$ is not generated, causing signal TH to be asserted by detector 78. Shut-down mode is maintained until a subsequent user initiated power-up command is issued. During the shut-down mode, chopper output switch 60 prevents pulse current $i_{co}$ from flowing; therefore, flyback transformer T401 is not energized.

When voltage $V_{FF}$ is low, voltage $V_{sd}$ at terminal 68a of shutdown circuit 168 is low so that overload switch 68 is not activated. Therefore, driver 61 responds to voltage $V_{PW}$ from pulse width modulator 58 by activating chopper output switch 60. Switch 60 conducts current $i_{co}$ in winding 52. As a result of pulsed current $i_{co}$, an induced voltage across secondary winding 53 of transformer T105 is generated and rectified by diode D1 to provide flyback transformer T401 energizing voltage $V_{HO}$. Thus, power supply 50 operates in the power-up mode.

Assume, hypothetically, that, during the time that chopper power supply 50 is operating in the power-up mode, ultor current $i_u$ provided by ultor supply 187, increases excessively. The excessive increase in current may occur as a result of excessive video signal drive or arcings in the CRT. It follows that the amplitude of current $i_{co}$ through chopper output switch 60 will also increase in amplitude to satisfy the increased power demand by ultor voltage supply 187. A substantial surge of current $i_{co}$, that characterizes an overload condition, causes a corresponding increase in the amplitude of voltage $V_{OL}$ at terminal 68a of shutdown circuit 168. When voltage $V_{OL}$ exceeds the threshold level of detector 68b, overload switch 68 becomes conductive, thus initiating the shut-down mode of chopper power supply 50. When chopper power supply 50 is in the shut-down mode, voltage $V_{HO}$ that is coupled to flyback transformer T401 becomes low, causing ultor voltage U, current $i_u$, current $i_{co}$ and voltage V1 to drop substantially, thus protecting circuit components from being harmed.

Had voltage $V_{FF}$ remained low while the cause for the overload condition was continuing, chopper power supply 50 current $i_{co}$ would have been oscillatory. This is so because after the occurrence of the shut-down mode, current $i_{co}$ from terminal 60a of chopper output switch 60 is reduced substantially, thus causing voltage $V_{OL}$ that controls detector 68b to be low enough so as to discharge capacitor $C_{68}$. When capacitor $C_{68}$ is discharged by transistor $T_{68}$, overload switch 68 becomes nonconductive. With overload switch 68 being nonconductive, chopper power supply 50 is not prevented from reinitiating the power-up mode. If this situation were permitted to occur, current $i_{co}$ or voltage $V_{HO}$ would have gone up again at the end of a certain period after the beginning of the shut-down mode. This would cause the repetition of the overload type shutdown mode if the overload condition is a persistent one.

Microcomputer 76 periodically polls signal TH of threshold detector 78 using, illustratively, a software driven time-out loop for establishing the polling period. The periodic polling is used for detecting the overload initiated shut-down mode in chopper power supply 50. If overload initiated shut-down mode is detected, during any periodic polling step, microcomputer 76 sends to interpreter 74 an instruction data word 82 via bus 91. Interpreter unit 74 responds to word 82 by generating signal RESET that causes signal CLEAR. Signal CLEAR resets flip-flop 70, causing voltage $V_{FF}$ to be sufficiently positive thus forcing overload switch 68 to be conductive. In this way, the shut-down mode is maintained indefinitely, or until a new user initiated power-on command is issued. Thus, microcomputer 76 prevents the oscillatory condition of current $i_{co}$ or voltage $V_{HO}$.

In the event of a drop in voltage $V_{AC}$, as a result of AC power brownout, threshold detector 86 causes the assertion of signal RESMIC that causes voltage $V_{+5\ V}$ of regulator 87 to drop immediately. It should be understood that when voltage $V_{AC}$ drops, signal TH of detector 78 may be asserted. Simultaneously, microcomputer 76 is initialized by signal RESMIC. During the interval in which signal RESMIC is asserted, microcomputer 76 is in its initialization, or reset state, in which signal RESMIC controls the operation of microcomputer 76. For example, in the reset state, microcomputer 76 may not execute any instruction. Thus, asserted signal TH is prevented from causing the generation of signa $V_{sd}$. During the reset state, the periodic polling step is suspended until, illustratively, 300 millisecond period has elapsed from the time signal RESMIC disappears subsequent to voltage $V_{AC}$ recovery.

The normal periodic polling is suspended throughout the interval in which voltage $V_{AC}$ that energizes chopper power supply 50 is below a predetermined amplitude. Because the periodic polling is suspended, microcomputer 76 does not respond to the asserted signal TH by, for example, resetting flip-flop 70, as in step 3c of FIG. 3.

This feature is beneficial because, otherwise, a drop of voltage $V_{AC}$ of FIG. 2 would have caused microcomputer 76 initiated brownout type shut-down. Such brownout type shut-down mode would have occurred because signal TH of threshold detector 78 is asserted as a result of a drop of voltage $V_{AC}$, leading microcomputer 76, in, for example, step 3c of FIG. 3, to instruct interpreter 74 of FIG. 2 to issue signal RESET for resetting flip-flop 70. After voltage $V_{AC}$ is subsequently restored to the appropriate amplitude, chopper power supply 50 would have remained in the shut-down mode. Such brownout type shut-down mode is not desirable because it causes an undesirable interruption that necessitates a new user initiated power-on command for continuing television program viewing. This interruption would have occurred even as a result of a relatively short AC power brownout duration. On the other hand, if the brownout duration is relatively long, upon restoration of voltage $V_{AC}$, flip flop 70 remains in its reset state and signal $V_{sd}$ is asserted.

In each periodic polling step, microcomputer 76 interrogates interpreter 74 via serial bus 91 to find out, additionally, the channel that is being tuned and the volume control status. Elements 70-74 are powered by DC power supply 85, that maintains substantially at a constant level its other output voltage $V_I$ during the entire short dropout period of voltage $V_{AC}$. Voltage $V_I$ during such short dropout period is supplied, illustratively, by a large filter capacitance, not shown in the figures, that supplies the required operating current. Thus, for example, following the restoration of voltage $V_{AC}$ to normal amplitude after a short duration of voltage $V_{AC}$ drop, microcomputer 76 will obtain information regarding, for example, the channel status or the volume control status from a register of interpreter 74 that retains this information even during brownout. This feature enables microcomputer 76 to respond to, for example, a user command that requests the volume level to increase from the current level. Thus, even when microcomputer 76 loses information regarding the volume level during AC voltage $V_{AC}$ brownout, it can resume normal operation after voltage $V_{AC}$ is restored.

What is claimed is:

1. A television supply source with a fault protection comprising:

a power supply that selectively operates in a power-up mode and in a shut-down mode, for generating in said power-up mode a normal operating level of a first supply voltage, wherein when said power supply is in said shut-down mode the level of said first supply voltage is lower than in said power-up mode, said power supply being responsive to power-up and shutdown control signals, respectively, for assuming said power-up and shut-down modes when said power-up and shutdown control signals are asserted, respectively;

means for asserting said power-up control signal;

a delay unit responsive to said power-up control signal for delaying said power-up control signal by a first interval having a predetermined length immediately following the time in which said power-up control signal is asserted to assert at the end of said first interval, a delayed power-up control signal that, in normal operation sequence, occurs after said first supply voltage is inside a predetermined normal operation voltage range;

a detector responsive to said first supply voltage for generating an output signal when the level of said first supply voltage is outside said predetermined normal operation voltage range; and means responsive to both the delayed power-up control signal from said delay unit and said detector output signal for generating at an output terminal said shutdown control signal to cause said power supply to assume said shut-down mode when, at the end of said first interval, said first supply voltage is outside said predetermined normal operation voltage range, such that prior to the end time of said first interval, the signal at said output terminal is prevented from affecting said first supply voltage.

2. A supply source according to claim 1 wherein said power supply is coupled to a deflection circuit output stage that generates said first supply voltage.

3. A supply source according to claim 2 wherein said power supply comprises a switched mode power supply.

4. A supply source according to claim 1 further comprising means responsive to a user initiated power-up command for generating said power-up control signal and wherein said shut-down control signal generating means is responsive to said user initiated power-up command for allowing said power supply to assume operation in said power-up mode when said shut-down control signal generating means receives said user initiated power-up command.

5. A supply source according to claim 1 wherein said detector comprises a threshold detector for generating said detector output signal is generated when said first supply voltage is lower than a predetermined level of said predetermined voltage range.

* * * * *